July 16, 1968 G. B. DUNN, JR., ET AL 3,392,996
MOLDABLE INTEGRAL SPLIT HUB AND FLANGE ASSEMBLY
Filed Nov. 9, 1965

INVENTORS
GEORGE B. DUNN, JR.
ROBERT L. SIEBER
BY *James C. Davis Jr.*
THEIR ATTORNEY

# United States Patent Office 3,392,996
Patented July 16, 1968

3,392,996
MOLDABLE INTEGRAL SPLIT HUB AND FLANGE ASSEMBLY
George B. Dunn, Jr., and Robert L. Sieber, Fort Wayne, Ind., assignors to General Electric Company, a corporation of New York
Filed Nov. 9, 1965, Ser. No. 506,941
2 Claims. (Cl. 287—52.03)

ABSTRACT OF THE DISCLOSURE

A moldable shaft-engaging hub and flange assembly has an integral bifurcate hub and flange assembly wherein the flange is secured to the hub about the peripheral portion thereof diametrically opposed to the bifurcation and otherwise radially spaced from the hub. Deep radially extending apertures are provided in the respective bifurcated portions of the hub and the apertures are aligned to receive a bolt insertable laterally from one end of the hub. The bolt is inserted and finally disposed substantially tangentially to a shaft-receiving bore extending axially through the hub. Radially extending shoulders are provided adjacent the opening of the apertures to restrain the bolt in position after it is inserted and loosely coupled with a corresponding threaded nut. The shoulders adjacent the nut also conveniently restrain rotation thereof relative to the bolt when the latter is tightened to constrict the bore about a shaft to which it is secured. Preferably the shaft-receiving bore through the hub includes axially extending grooves and lands, with the latter equipped with arcuate shaft-engaging faces.

---

Figure 1:
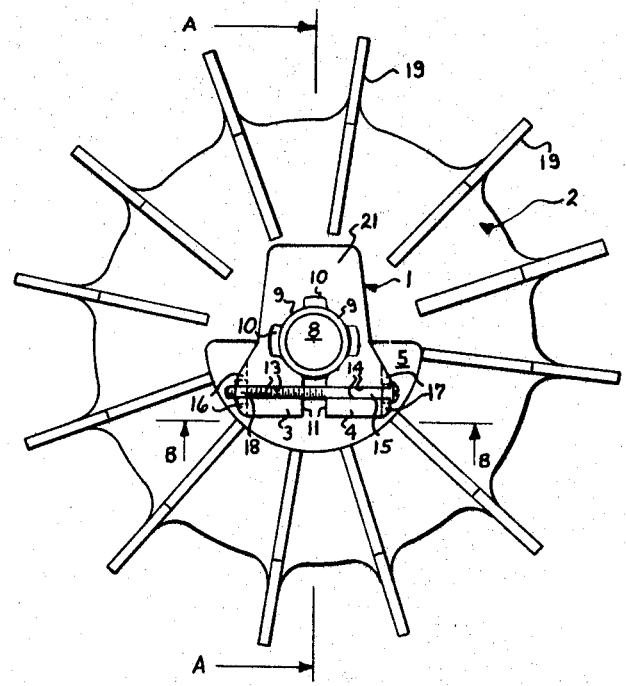

The present invention relates generally to means for fastening apparatus in fixed relationship on a substantially cylindrical shaft and, more specifically, pertains to a split hub and flange assembly for detachably mounting to a shaft.

A commonly employed device for providing a readily detachable mounting to a substantially smooth cylindrical shaft takes the general form of a bifurcate hub having a bolt-receiving hole, or holes, drilled tangentially to a shaft-receiving bore therein. The hub is tightened about the shaft by drawing the bolt and accompanying threaded device, typically a nut, together constricting the bore about the shaft. A principal disadvantage of such a fastening means is that the bolt-receiving holes must be drilled or otherwise formed in a separate machine operation even though the remainder of the assembly is readily formed by known techniques as casting or molding. There is heretofore an unfulfilled need in the art for a convenient, readily detachable hub and flange assembly that can be completely formed in a single casting or molding operation and which does not require machining of any description in order to adapt it for useful service.

Accordingly, it is a principal object of this invention to provide a readily moldable integral split hub and flange assembly for detachably mounting on a substantially smooth cylindrical shaft in fixed relationship thereto.

It is another object of this invention to provide a hub and bolt assembly wherein the hub is readily molded in its entirety and the associated bolt is readily insertable and locked in position prior to final tightening thereof.

Still another object of this invention is to provide a molded shaft-receiving hub having a shaft-engaging bore of closer tolerances than heretofore attainable in articles of this kind.

Yet another object of this invention is to provide a moldable shaft-engaging hub and flange assembly of non-metallic material adapted to be secured to a smooth cylindrical, rotatable shaft of hard metallic material.

The foregoing principal objects and others are achieved in accord with one aspect of the present invention by providing an integral bifurcate hub and flange assembly wherein the flange is secured to the hub about the peripheral portion thereof diametrically opposed to the bifurcation and otherwise is radially spaced from the hub. Deep radially extending apertures are provided in the respective bifurcated portions of the hub and the apertures are aligned to receive a bolt insertable laterally from one end of the hub. The bolt is inserted and finally disposed substantially tangentially to a shaft-receiving bore extending axially through the hub. Radially extending shoulders are provided adjacent the opening of the apertures to restrain the bolt in position after it is inserted and loosely coupled with a correspondingly threaded nut. The shoulders adjacent the nut also conveniently restrain rotation thereof relative to the bolt when the latter is tightened to constrict the bore about a shaft to which it is secured. Preferably the shaft-receiving bore through the hub includes axially extending grooves and lands, with the latter equipped with arcuate shaft-engaging faces.

Figure 2:
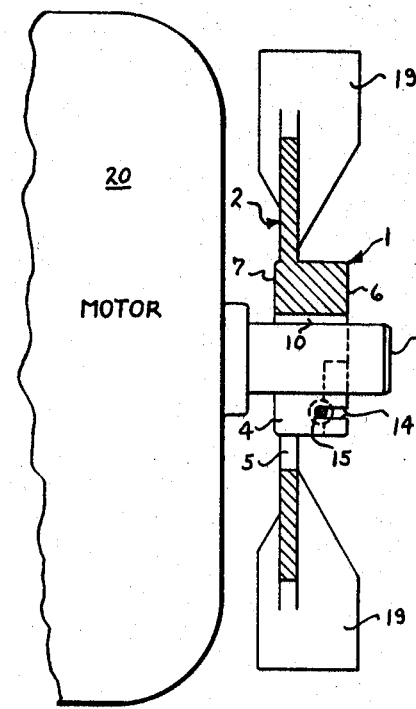

While the specification concludes with claims particularly pointing out and distinctly claiming the subject matter which we regard as our invention, it is believed that the invention will be better understood from the following description taken in connection with the accompanying drawing wherein corresponding components are similarly designated and in which:

FIGURE 1 is a plan view of a centrifugal fan assembly illustrating the fastening means of the present invention;
FIGURE 2 is a side sectional view taken along lines A—A of FIGURE 1; and
FIGURE 3 is a partial cross section bottom view taken along lines B—B of FIGURE 1.

The present invention arose from an effort to provide an integral molded fan assembly of non-metallic material which is readily detachably mountable on the smooth cylindrical shaft of an electric motor. The invention is believed to be most advantageously employed in this and similar settings and is accordingly illustrated and described in this environment. It will be apparent, however, that the hub and flange assembly applies equally to other rotatably mounted devices as pulleys, and the like, and in addition has substantial utility for detachably mounting various devices to cylindrical shafts that are smooth or otherwise, regardless of whether or not the shaft is intended to be rotated.

Figure 3:
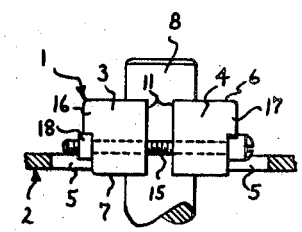

As illustrated in FIGURES 1–3, the particular embodiment of this invention presented comprises a centrally disposed hub 1 and an integral flange 2. Flange 2 surrounds hub 1 and extends radially outwardly from the peripheral portion of hub 1, that is diametrically opposite to legs 3 and 4 thereof. Flange 2 is otherwise radially spaced from the peripheral surface of hub 1 as most clearly shown at 5 in FIGURE 1.

Hub 1 has a shaft-receiving bore extending axially therethrough from one end 6 of hub 1 to the other end 7 thereof. The bore is adapted to receive a shaft 8 and includes a plurality of axially extending lands 9 equipped with arcuate shaft-engaging faces circumferentially spaced about the bore. Radially outwardly extending grooves 10 are intermediate lands 9.

A radially extending slot 11, having a width substantially less than the average, or nominal, diameter of the bore extends the full axial length of hub 1 and communicates from the bore through the outer periphery of hub 1. There are thus defined opposed spaced portions of hub 1 giving the hub a generally U-shaped right cross section throughout its axial length with the bore being in the bight of the U and the opposed portions of hub 1 on either side of slot 11 providing respective shaft-straddling legs 3 and 4.

Two aligned bolt-receiving apertures 13 and 14 are respectively located in legs 3 and 4 intermediate the radial lengths thereof and outside the bore. Apertures 13 and 14 extend axially from deep within legs 3 and 4 through end surface 6 of hub 1. The axial depth of apertures 13 and 14 is substantially greater than the radial length thereof and preferably at least two times greater than the radial length thereof. Apertures 13 and 14 are adapted to receive laterally a threaded bolt 15 therethrough which is laterally insertable through end surface 6. Radially outwardly projecting shoulders 16 and 17 on legs 3 and 4, respectively, near the end openings thereof at surface 6, engage and restrain axial outward movement of bolt 15 when the latter is loosely coupled to a nut 18 and the combination is positioned deep within apertures 13 and 14. In addition, shoulders 16 on leg 3 restrain rotation of nut 18 relative to bolt 15 when the latter is rotated to tighten or loosen the assembly.

In the illustrated environment, flange 2 carries a plurality of circumferentially spaced fan blades 19, which are spaced to provide quiet operation. In addition, the entire integral assembly is mounted on a shaft 8 which is projecting from a motor, that may be an electric motor, shown generally at 20 in FIGURE 2.

Providing a hub and flange assembly with a bore having lands 9 and grooves 10 is a preferred embodiment of the invention and multiplies the pressure otherwise exerted on the shaft by a given amount of tension in bolt 15. This has been found to be particularly advantageous in the case where the integral assembly is of non-metallic material, as any of the readily available plastic compositions, and the shaft to which the assembly is mounted is fabricated of a hard metallic material. In addition, the land and groove construction enables fabrication of a shaft-receiving bore of closer tolerances. This is because, in the molding of assemblies of the kind shown, it is necessary that some degree of taper, or draft, as it is known in the art, be in the die or mold in order to facilitate removal of the molded assembly without breaking components thereof. To this end, we have obtained satisfactory experience by providing an axially increasing taper for the grooves which is substantially greater than the corresponding taper of the lands. In this way, the radius of the lands may be made to more closely conform to the diameter of a shaft of unchanging radial dimension, without the disadvantage of difficult removal of the assembly from the mold. This is because the required average taper is largely borne by the grooves. Minimum draft for the lands additionally serves to reduce unequal stressing of the hub and rocking movement when the fan assembly is secured to a shaft.

Space, or flange aperture 5, is preferably semicircular in shape as illustrated in FIGURE 1 with a maximum radious in excess of the maximum radius of legs 3 and 4. This enables shoulders 16 and 17 to be formed in a single molding step without supplementary machining.

In order to provide a statically balanced hub and flange assembly, a portion 21 of hub 1, opposite legs 3 and 4, is distended. The additional mass contributed by portion 21 in combination with the absence of material in opposite space 5, provides coutnerbalance for legs 3 and 4 and bolt 15 and nut 18. Furthermore, the assembly of this invention permits greater dynamic balance to be achieved by extending apertures 13 and 14 deeply within hub 1 so that bolt 15 lies substantially in the plane of flange 2. Because the bolt is laterally receivable in slots 13 and 14, bolt 15 may be inserted without interference with the blades 19 or flange 2. It is apparent that interference could occur in the event bolt 15 were inserted in a bolt-receiving hole.

The width of slot 11 is advantageously selected to be as narrow as possible consistent with providing a suitable mold-forming blade that is not unduly fragile. A dimension of from 1/8 to 1/4 inch has been found suitable in typical applications.

For ease of assembly, bolt 15 is advantageously selected to have a length sufficient to slide past shoulders 16 and 17 when a suitable nut 18 is loosely secured to the end thereof. In this way, the bolt and nut assembly may be snapped into place where it remains pending attachment of the hub and flange assembly to a shaft. It is particularly convenient to provide the opening to apertures 13 and 14 in the outside end of hub 1 in order to facilitate assembly and disassembly. Of course, the hub and flange assembly can be provided either with or without the attached bolt secured in place.

There has been shown and described herein a particularly advantageous split hub and flange assembly that is readily moldable in a single operation. It will be readily appreciated by those skilled in the art that the invention is equally adapted to casting techniques and the assembly can as well as fabricated of metal, for example, aluminum.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically described.

What we claim as new and desire to secure by Letters Patent of the United States is:

1. A readily moldable integral split hub and flange assembly for detachable mounting on a cylindrical shaft in fixed relationship thereto, said assembly comprising:
    (a) a hub having a shaft-receiving bore extending axially therethrough;
    (b) a radially extending slot in said hub extending the full axial length thereof and communicating from said bore through the outer periphery of said hub thereby bifurcating said hub and defining opposed spaced portions thereof;
    (c) means adapted to constrict the bore about a shaft receivable therein; and
    (d) a flange integral with and surrounding said hub, said flange extending radially outwardly from the peripheral portion of said hub diametrically opposite to said slot and being spaced from the periphery of said hub adjacent said slot, whereby said flange does not substantially inhibit drawing of said spaced portions together to constrict said bore about a shaft;
    (e) said bore including a plurality of axially extending lands with arcuate shaft-engaging faces circumferentially spaced thereabout and radially outwardly extending grooves intermediate said lands, and wherein said lands and grooves have an axial taper and the angle of taper of said grooves is greated than the angle of taper of said lands, whereby said assembly is readily, separated from a mold and said bore conforms more nearly to a cylindrical shaft throughout the axial length of the hub.

2. A readily moldable integral split hub and flange assembly for detachable mounting on a smooth cylindrical shaft in fixed relationship thereto, said assembly comprising:
    (a) a hub having a shaft-receiving bore extending axially therethrough from one end of said hub to the other end thereof;
    (b) a radially extending slot, having a width substantially less than the diameter of said bore, extending the full axial length of said hub and communicating from said bore through the outer periphery of said hub defining opposed spaced portions thereof, said hub having a generally U-shaped right cross section throughout its axial length with said bore being in the bight of the U and the opposed portions of said hub on either side of said slot providing shaft-straddling legs;
    (c) said bore having a plurality of axially extending lands with arcuate shaft-engaging faces circumferentially spaced there-about and radially outwardly extending grooves intermediate said lands, said lands and said grooves each having an axial taper and the taper of said grooves being greater than the taper of said lands, two of said lands being adjacent said slot and spaced on opposite sides thereof;

(d) two aligned bolt-receiving apertures respectively located in said legs intermediate the radial lengths thereof outside said bore, said apertures extending axially from within the respective legs through one end surface of said hub, the depth of said apertures being at least two times greater than the width thereof, said apertures being adapted to receive laterally a bolt therethrough from said end surface of the hub, and radially outwardly projecting shoulders on each of said legs adjacent the end openings of their respective apertures for engaging and restraining axial outward movement of a bolt head and nut respectively of a loosely coupled nut and threaded bolt combination positionable deep within the apertures, the shoulders on at least one of said legs additionally adapted to restrain rotation of a nut adjacent thereto relative to the bolt; and (e) a flange intgeral with and surrounding said hub, said flange extending radially outwardly from the peripherial portion of said hub diametrically opposite said legs and said flange being radially spaced from the periphery of said hub adjacent said legs, whereby said flange does not substantially inhibit drawing of said legs toward each other for constricting said bore about a shaft.

References Cited

UNITED STATES PATENTS

| | | | |
|---|---|---|---|
| 439,493 | 10/1890 | Eames | 287—52.04 XR |
| 748,385 | 12/1903 | Lester | 287—52.03 |
| 1,136,557 | 4/1915 | Ross | 287—535 |
| 1,367,500 | 2/1921 | Redmon | 287—535 |
| 2,256,605 | 9/1941 | Bier | 74—603 |
| 2,259,460 | 10/1941 | Dexter | 287—53 |
| 2,278,698 | 4/1942 | Green | 287—53 |
| 2,753,702 | 7/1956 | Dunn | 287—535 XR |
| 3,021,049 | 2/1962 | Settle | 287—52.06 XR |

EDWARD C. ALLEN, *Primary Examiner.*

CARL W. TOMLIN, *Examiner.*

ANDREW V. KUNDRAT, *Assistant Examiner.*